(12) United States Patent
Sugihara (10) Patent No.: US 7,442,451 B2
(45) Date of Patent: Oct. 28, 2008

(54) ELECTRONIC APPARATUS AND CAMERA

(75) Inventor: Hiroyasu Sugihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 11/352,687

(22) Filed: Feb. 13, 2006

(65) Prior Publication Data

US 2006/0182435 A1   Aug. 17, 2006

(30) Foreign Application Priority Data

Feb. 17, 2005  (JP) .............................. 2005-040676

(51) Int. Cl.
 *H01M 8/00* (2006.01)
 *G03B 7/26* (2006.01)
(52) U.S. Cl. .......................... 429/12; 396/301; 396/302
(58) Field of Classification Search .............. 429/12–46
 See application file for complete search history.

(56) References Cited

U.S. PATENT DOCUMENTS

| | | | |
|---|---|---|---|
| 5,752,096 A * | 5/1998 | Ichino et al. .................. | 396/85 |
| 5,976,725 A | 11/1999 | Gamo et al. | |
| 6,057,051 A | 5/2000 | Uchida et al. | |
| 6,233,402 B1 * | 5/2001 | Solomon et al. ................ | 396/6 |
| 6,704,053 B1 * | 3/2004 | Niikawa et al. ............. | 348/340 |
| 6,777,118 B2 * | 8/2004 | Shioya ........................ | 429/19 |
| 2003/0154230 A1 * | 8/2003 | Harada et al. ............... | 708/801 |
| 2005/0014044 A1 * | 1/2005 | Thirukkovalur et al. ....... | 429/26 |

FOREIGN PATENT DOCUMENTS

| JP | 9-213359 A | 8/1997 |
|---|---|---|
| JP | 10-064567 A | 3/1998 |

* cited by examiner

*Primary Examiner*—Dah-Wei Yuan
*Assistant Examiner*—Steven Scully
(74) *Attorney, Agent, or Firm*—Canon U.S.A., Inc. I.P. Division

(57) ABSTRACT

An electronic apparatus, such as a camera, is configured to be driven by a fuel cell. The fuel cell includes a fuel unit and a power generation unit. The fuel unit is configured to store fuel, and the power generation unit is configured to generate electric power with at least one power generation cell by receiving fuel from the fuel unit. The camera includes a fuel cell storage section configured to store both the fuel unit and the power generation unit, and a power generation unit determination device configured to determine an output characteristic of the power generation unit. A memory in the power generation unit holds information on one of a voltage, an electric current, and an internal resistance. This information is read by a system controller in the camera.

9 Claims, 6 Drawing Sheets

ELECTRONIC APPARATUS AND CAMERA

BACKGROUND OF THE INVENTION

1. Field of the Invention

The present invention relates to a power supply section of an electronic apparatus or a camera, and more particularly to a cell change technique in an electronic apparatus or a camera which is driven by a fuel cell.

2. Description of the Related Art

In recent years, development of utilizing a fuel cell as a compact power supply source in a portable apparatus or the like has been pursued. A fuel cell utilizes an electric current which is generated when hydrogen ($H_2$) contained in fuel reacts with oxygen ($O_2$) to form by-product water ($H_2O$). Therefore, by supplying fuel such as a hydrogen gas, methanol or the like, into a fuel cell, electrical current created from the ionic exchange between the $H_2$ and the $O_2$, may be used as a source of electricity to power various apparatuses and devices.

The fuel cell has an energy density higher than that of a conventional battery (primary battery, secondary battery). Therefore, if the fuel cell is used as a power supply source for a compact electronic apparatus, long-duration drive, compactness and light weight of the compact electronic apparatus can be attained. In particular, a camera, which has been multi-functionally developed, can also support the increase of power consumption. Further, since the fuel cell may be refilled with fuel, electric power can successively be generated. Accordingly, the inconvenience of frequent change and recharging of a battery as in a conventional battery is eliminated, and the convenience, when the camera is used, is remarkably improved.

For instance, a portable electric apparatus has been proposed which includes a power generation unit, a fuel unit for supplying hydrogen gas to the power generation unit, a joint section which is mounted on a hydrogen supply path between the fuel unit and the power generation unit and which detachably connects the fuel unit and the power generation unit, a mini-valve for opening and closing the supply of hydrogen gas, and a pressure regulator for regulating pressure of hydrogen gas (for example, see Japanese Patent Application Laid-Open No. 10-64567 (corresponding to U.S. Pat. No. 5,976, 725)).

Further, a technique which is configured to allow a fuel cell for mounting on apparatuses to be contained in a portable apparatus has been disclosed (for example, see Japanese Patent Application Laid-Open No. 9-213359 (corresponding to U.S. Pat. No. 6,057,051)).

However, a fuel cell configuration in the above-described conventional examples does have disadvantages. That is, with respect to the fuel cell configurations disclosed in Japanese Patent Application Laid-Open Nos. 10-64567 and 9-213359, the capacity of fuel and a voltage to be outputted are uniquely predetermined as long as a fuel cell which is designed to be used for an associated apparatus is used. Thus, users can not freely choose these values in accordance with apparatus use. For example, when a camera is driven by a fuel cell, even if it is intended to carry out photographing at an increased speed in a continuous-shooting mode higher than that in a normal condition, it is difficult to increase a voltage for driving a motor if only a predetermined specific fuel cell having set performance characteristics is used. Thus, the camera is not capable of supporting the attempt at increased speed continuous-shooting. Also, likewise, when it is intended to continuously use a camera for a time as long as possible, if a fuel cell having a large capacity of fuel is used, time of use can be made longer. However, if only a predetermined specific fuel cell having specific design parameters can be used, it becomes impracticable to use a fuel cell having different design parameters.

As a result, due to limitations inherent with currently available fuel cell technologies for small electronic devices, it is difficult to flexibly meet various performance characteristics that users require for such apparatuses.

SUMMARY OF THE INVENTION

The present invention has been made in consideration of the above situation, and is directed to an electronic apparatus, such as camera, that is powered by a fuel cell and are capable of flexibly meeting various functions required by users.

In one aspect of the present invention, an electronic apparatus configured to be driven by a fuel cell includes a fuel cell storage section and a power generation unit determination device. The fuel cell includes a fuel unit and a power generation unit. The fuel unit is configured to store fuel. The power generation unit is configured to generate electric power with at least one power generation cell by receiving fuel from the fuel unit. The fuel cell storage section is configured to store both the fuel unit and the power generation unit. The power generation unit determination device is configured to determine an output characteristic of the power generation unit.

In another aspect of the present invention, a camera configured to be driven by a fuel cell includes a fuel cell storage section and a power generation unit determination device. The fuel cell includes a fuel unit and a power generation unit. The fuel unit is configured to store fuel. The power generation unit is configured to generate electric power with at least one power generation cell by receiving fuel from the fuel unit. The fuel cell storage section is configured to store both the fuel unit and the power generation unit. The power generation unit determination device is configured to determine an output characteristic of the power generation unit.

Further exemplary embodiments, features and aspects of the present invention will become apparent from the following detailed description with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Various exemplary embodiments, features and aspects of the present invention will now be herein described in detail in accordance with the accompanying drawings.

Figure 1:
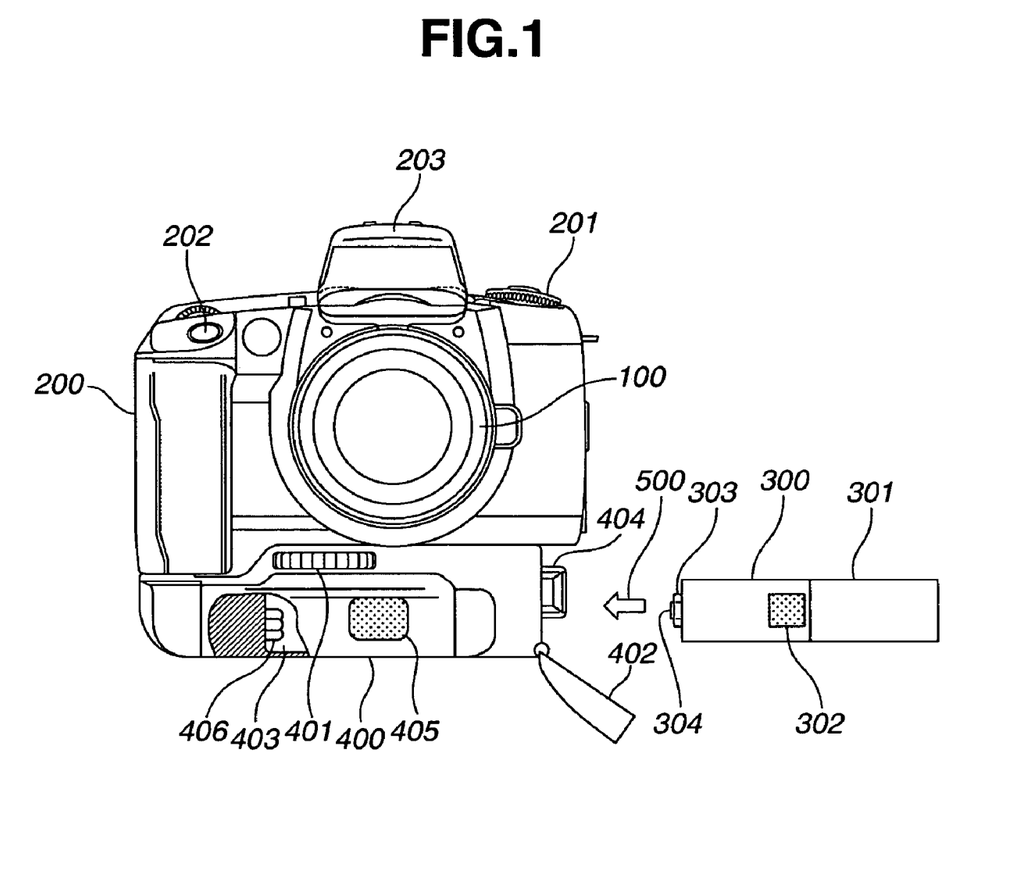
FIG. 1 illustrates an external view of an exemplary electronic device, such as a camera, according to an embodiment of the present invention.

FIG. 1 illustrates a diagram showing the external view of an electronic still camera according to an embodiment of the present invention. In FIG. 1, reference numeral 200 denotes a camera body, reference numeral 201 denotes a mode setting switch, reference numeral 202 denotes a release switch, and reference numeral 203 denotes a flash unit. Also, a photographic lens unit 100 is detachably attached to the front face of the camera body 200 by a mount mechanism (not shown).

Reference numeral 400 denotes a vertical position grip serving as a battery pack, which is detachably attached to the camera body 200 by an attaching and detaching mechanism 401. The camera body 200 and the vertical position grip 400 are connected to each other by a well-known screw mechanism. When the attaching and detaching mechanism 401 is rotated, the connection screw is tightened or loosened. The side face of the vertical position grip 400 includes an open/close door 402. The open/close door 402 is attached to the vertical position grip 400 via a hinge mechanism. Thus, the open/close door 402 is configured to open and close.

The vertical position grip 400 includes a battery chamber 403 adjacent to the open/close door 402. The battery chamber 403 is configured to store a fuel cell power generation unit 300 and a fuel storage tank or unit 301. The vicinity of the opening part of the battery chamber 403 includes a latch mechanism 404 that is configured to latch the power generation unit 300 and the fuel unit 301 when the power generation unit 300 and the fuel unit 301 are stored in the battery chamber 403. The latch mechanism 404 is, for example, a molded latch claw. Note that the side face of the vertical position grip 400 includes a vertical position grip side vent hole 405. The vertical position grip side vent hole 405 is arranged so as to face a vent hole 302 of the power generation unit 300 when the power generation unit 300 is stored in the battery chamber 403. The vertical position grip side vent hole 405 is used to capture oxygen, which is required when the power generation unit 300 generates electric power, and to discharge water vapor, which is generated during generation of electric power.

The side face of the power generation unit 300 includes a power generation unit electric contact point 303 and a power generation unit signal contact point 304. The power generation unit electric contact point 303 is used to supply electric power to the vertical position grip 400 when the power generation unit 300 is stored in the vertical position grip 400. The power generation unit signal contact point 304 is used to communicate with the vertical position grip 400.

An arrow 500 indicates a direction of insertion when the power generation unit 300 and the fuel unit 301 are inserted into the battery chamber 403 inside the vertical position grip 400. After the fuel cell power generation unit 300 and the fuel unit 301 are connected to each other, the power generation unit 300 and the fuel unit 301 are inserted into the vertical position grip 400 in the direction of the arrow 500 in FIG. 1.

When the power generation unit 300 and the fuel unit 301 of the fuel cell are stored in the vertical position grip 400, they are latched by the latch mechanism 404 so as not to drop off from the battery chamber 403. Inside the battery chamber 403 of the vertical position grip 400, electric contact points 406 are mounted. The electric contact points 406 are configured to come into contact with the power generation unit electric contact point 303 and the power generation unit signal contact point 304 to receive electric power and a communication signal when the power generation unit 300 and the fuel unit 301 are completely stored in the battery chamber 403.

Figure 2:
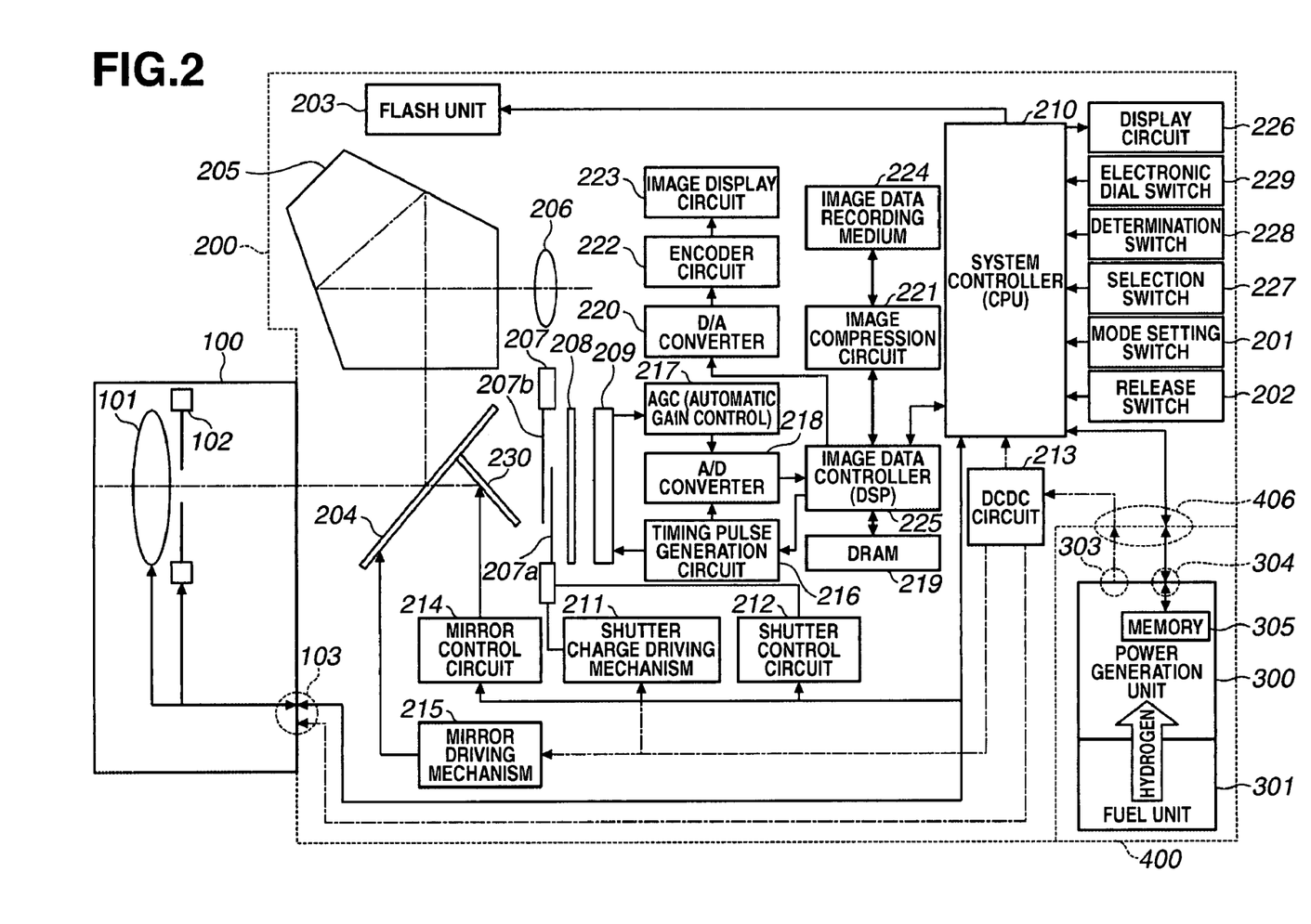
FIG. 2 illustrates a block diagram of the exemplary electronic device according to the embodiment of the present invention.

FIG. 2 illustrates a block diagram of the exemplary electronic device according to the embodiment of the present invention. For illustrative purposes, the electronic device shown in FIG. 2 is a camera. An electrical architecture of the embodiment of the present invention will now be herein described with reference to FIG. 2. Note that in FIG. 2, a solid line arrow indicates a signal and a dotted line arrow indicates the transmission of electric power.

As shown in FIG. 2, the photographic lens unit 100 is detachably attached to the camera body 200 via a mount mechanism (not shown). The mount mechanism includes electric contact points 103, which is used to perform communication between the camera body 200 and the photographic lens unit 100 so as to drive a photographic lens 101 and a diaphragm 102 of the photographic lens unit 100.

A shooting beam forming an object image (not shown) is led to a quick-return mirror 204, which can swivel, through the photographic lens 101 and the diaphragm 102. The diaphragm 102 serves as an exposure unit to adjust the quantity of light. The center part of the quick return mirror 204 is formed of a half mirror. When the quick-return mirror 204 is moved down, a part of a beam passes through the quick-return mirror 204. A shooting beam reflected by the quick-return mirror 204 is refracted by a penta-prism 205 and is then observed by a user through an eyepiece lens 206.

Also, when the quick-return mirror 204 is moved up, a beam from the photographic lens 100 arrives at a CMOS sensor 209, serving as an imaging element, through a focal-plane shutter 207 in an opening state and a filter 208. The filter 208 has two functions. One function is to cut an infrared ray and mainly to lead a light ray in a visible region to the CMOS sensor 209. The second function is to serve as an optical low-pass filter. In addition, reference numeral 230 is a sub mirror which is configured to be folded when the quick-return mirror 204 is moved up.

The vertical position grip 400 is attached to the camera body 200 by the above-described attaching and detaching mechanism 401. Inside the vertical position grip 400, the power generation unit 300 and the fuel unit 301 are stored. The vertical position grip 400 has the electric contact points 406 and is configured to allow communication and power supply between the camera body 200 and the vertical position grip 400. The power generation unit 300 has the electric contact point 303 and the signal contact point 304, and is configured to allow communication and power supply between the power generation unit 300 and the vertical position grip 400. The power generation unit 300 is detachably connected to the fuel unit 301 and is configured to generate electrical power by receiving hydrogen supply from the fuel unit 301.

A memory 305, in which information on output characteristics (power generation voltage, electric current, internal resistance or the like) of the power generation unit 300 is written, is included inside the power generation unit 300. This memory 305 sends information on output characteristics of the power generation unit 300 to a system controller 210 on the camera side by an electric signal through the power generation unit signal contact point 304 and the electric contact points 406 of the vertical position grip 400. The system controller 210 on the camera side determines the characteristics of the power generation unit 300 based on the output information sent from the memory 305 of the power generation unit 300 and can change a drive sequence of the camera. The detail of the power generation unit 300 will be described later.

The traveling of a leading curtain 207a and a trailing curtain 207b of the focal-plane shutter 207 is carried out by a spring. In order to allow the next traveling after the traveling is completed, a spring charge is required. A shutter charge driving mechanism 211 serves to drive the spring charge. In the focal-plane shutter 207, the leading curtain 207a retracts from a light path of an object beam in response to a release signal from the release switch 202 during photographing to start an exposure. The trailing curtain 207b retracts from a light path of an object beam during finder observation and blocks the object beam at predetermined timing after the start of traveling of the leading curtain 207a during photographing. The focal-plane shutter 207 is controlled by a shutter control circuit 212, which receives a command from the system controller 210. Further, the shutter charge driving mechanism 211 receives electric power generated by the power generation unit 300 through a DCDC circuit 213 and is driven accordingly. Note that a time period required for the shutter charge depends on a voltage supplied from the DCDC circuit 213.

Further, the up and down driving of the above-described quick-return mirror 204 and sub mirror 230 is carried out by a spring. Thus, the spring charge is required to allow the next driving after mirror-down driving is completed. A mirror driving mechanism 215 serves to drive the spring charge. Further, the quick-return mirror 204 and the sub mirror 230 carry out the up driving in response to a release signal from the release switch 202 during photographing. After the traveling of the trailing curtain 207b is completed, the down driving is carried out at predetermined timing. Furthermore, the driving of the quick-return mirror 204 and the sub mirror 230 is controlled by a mirror control circuit 214, which receives a command from the system controller 210. The mirror driving mechanism 215 receives electric power from the DCDC circuit 213 to drive the quick-return mirror 204 and the sub mirror 230. A time period required for the up and down driving depends on a voltage supplied from the DCDC circuit 213.

Also, an image data controller 225 is connected to the system controller 210. The image data controller 225 serves as a correction data sampling unit and a correction unit which are configured by a DSP (digital signal processor). The image data controller 225 executes control of the CMOS sensor 209, and correction, processing or the like of image data input from the CMOS sensor 209 based on a command from the system controller 210.

A timing pulse generation circuit 216, an AGC 217, an A/D converter 218, a DRAM 219, a D/A converter 220, and an image compression circuit 221 are connected to the image data controller 225. The timing pulse generation circuit 216 outputs a pulse signal required to drive the CMOS sensor 209. The AGC 217 receives a timing pulse generated by the timing pulse generation circuit 216 together with the CMOS sensor 209 and adjusts gain of an analog signal corresponding to an object image output from the CMOS sensor 209. The A/D converter 218 converts the gain-adjusted analog signal into a digital signal. The DRAM 219 temporarily stores the obtained image data (digital data).

Further, an image display circuit 223 is connected to the D/A converter 220 through an encoder circuit 222. Furthermore, an image data recording medium 224 is connected to the image compression circuit 221. The image display circuit 223 serves as a circuit for displaying image data captured by the CMOS sensor 209.

The image data controller 225 converts image data on the DRAM 219 into an analog signal by using the D/A converter 220 and outputs the analog signal to the encoder circuit 222. The encoder circuit 222 converts the output of the D/A converter 220 into a video signal (e.g., an NTSC signal) which is required to drive the image display circuit 223.

The image compression circuit 221 serves as a circuit for carrying out compression and conversion of image data by performing well-known compression processing. The converted image data is stored in the image data recording medium 224.

Further, a display circuit 226, the release switch 202, the mode setting switch 201, a selection switch 227, a decision switch 228, and an electronic dial switch 229 are connected to the system controller 210. The display circuit 226 displays information on an operation mode and information on exposure (a shutter time, an aperture value, or the like) of the camera. The release switch 202 is operable for starting an image capture operation. The mode setting switch 201 is operable for setting a mode to execute a user-desirable operation by the camera. The selection switch 227 is operable for selecting a desirable parameter from among various parameters to be selected. The decision switch 228 is operable for deciding the selected parameters. The electronic dial switch 229 is operable for displaying parameters while shifting parameters upward or downward by a rotating operation. A flash unit 203 has the function of projecting AF auxiliary light and the function of controlling the amount of flash.

Figure 3A:
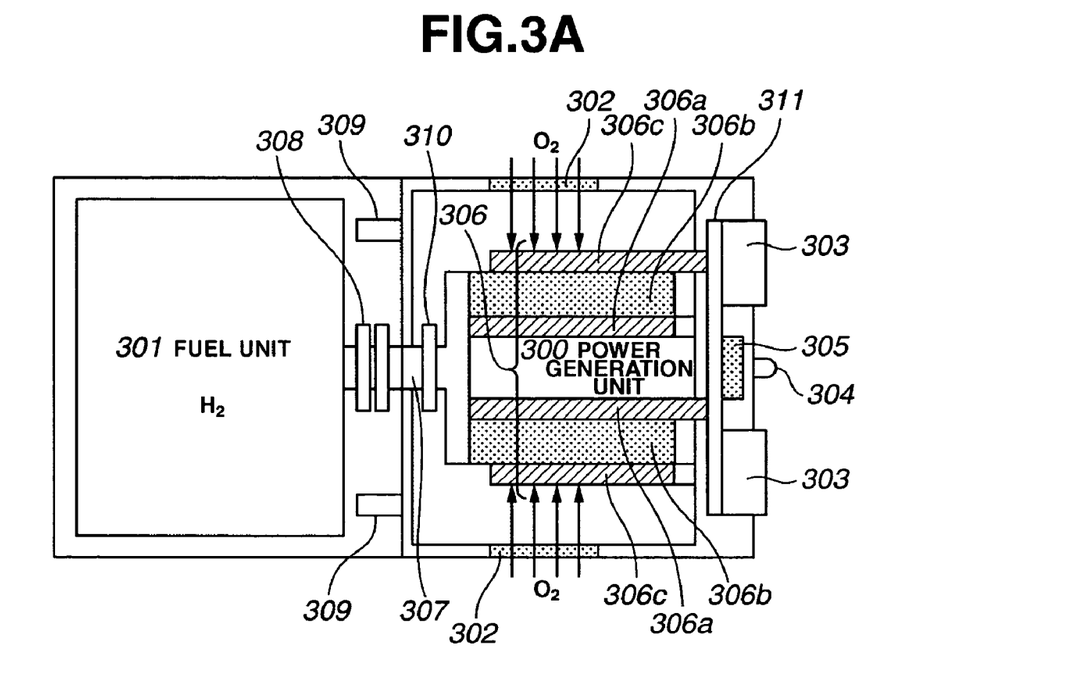
FIG. 3A illustrates a detailed diagram of an exemplary fuel cell representing a connected state between a fuel unit and a power generation unit according to the embodiment of the present invention.
Figure 3B:
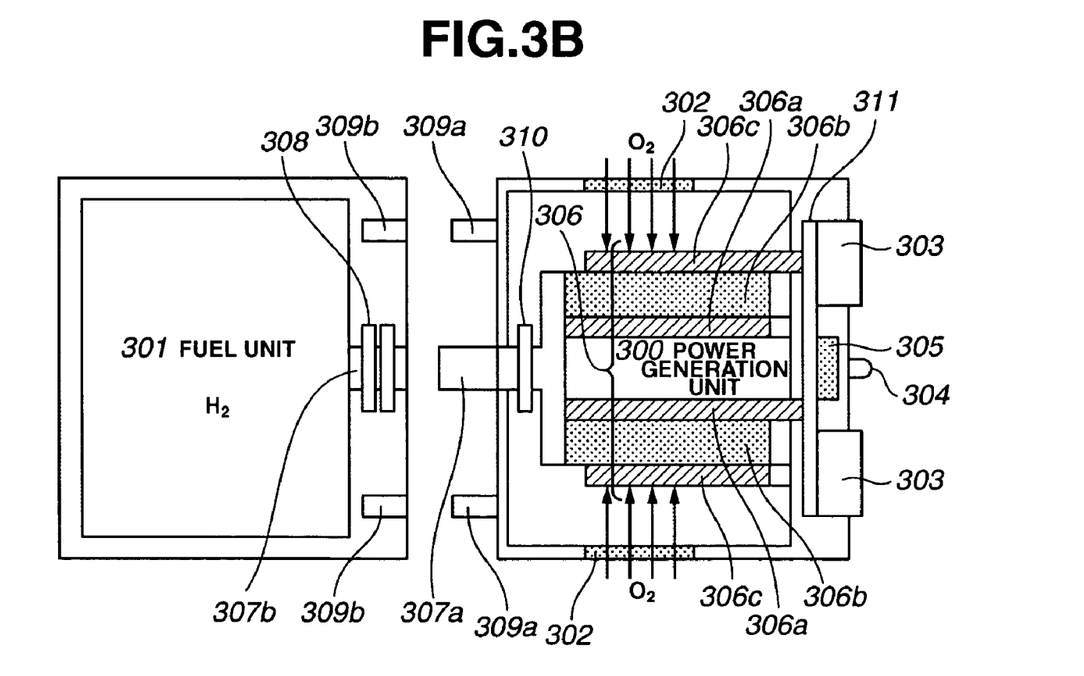
FIG. 3B illustrates a detailed diagram of the fuel cell representing a separated state of the fuel unit from the power generation unit according to the embodiment of the present invention.

FIGS. 3A and 3B illustrate a block diagram showing an exemplary configuration of a fuel cell adapted to be integrated with the exemplary electronic device according to the embodiment of the present invention. The detailed configuration of the fuel cell will be described with reference to FIGS. 3A and 3B. FIG. 3A illustrates a state in which the fuel cell power generation unit 300 and the fuel tank or unit 301 are connected to each other. FIG. 3B illustrates a state in which the fuel unit 301 is separated from the power generation unit 300. The fuel cell powerplant according to the embodiment of the present invention includes a polymer electrolyte power generation unit 300 in which hydrogen serving as fuel is made to chemically react with oxygen serving as an oxidizer to form electric energy, and a fuel unit 301 as a sealable vessel made from a hydrogen storage alloy for storing hydrogen which serves as fuel for the fuel cell.

The external part of the fuel cell power generation unit 300 will now be described first. The power generation unit 300 has a vent hole 302 on the side face of the power generation unit 300. The vent hole 302 is provided for capturing oxygen, which is used for reaction as an oxidizer, from outside air and for discharging water vapor which is generated during reaction. Further, the vent hole 302 also has the functions of discharging formed water as water vapor, radiating heat generated by the reaction, and capturing oxygen as an oxidizer from outside air. Another side face of the power generation unit 300 includes an electric contact point 303 for bringing out generated electricity and a signal contact point 304 for transmitting the output characteristics of the power generation unit 300 as an electric signal. Further, joint portions 309a and a pipe 307a protrude from the other side face of the power generation unit 300 (see FIG. 3B). The joint portions 309a are configured to detachably connect the power generation unit 300 to the fuel unit 301. The pipe 307a serves as a hydrogen supply path when the power generation unit 300 is connected to the fuel unit 301. In this embodiment, a joint section 309 connects the power generation unit 300 and the fuel unit 301 by a fitting. Thus, the joint portion 309a on the power generation unit 300 side, for instance, may be a fitting pin and the joint portion 309b on the fuel unit 301 side, for instance, may be a fitting hole.

The inside of the power generation unit 300 will be described next. A cell portion 306 for generating electric power includes one or more cells composed of a fuel electrode 306a, a polymer electrolyte membrane 306b, an oxygen electrode 306c, and a catalyst. The cells are electrically connected in series. Further, the cell portion 306 includes a pipe 307a for supplying hydrogen serving as fuel from the fuel unit 301. The pipe 307a includes a connecting valve mechanism 310 for preventing a leak of hydrogen. The connecting valve mechanism is configured by a well-known connecting valve mechanism disclosed in Japanese Patent Application Laid-Open No. 10-64567. Further, the fuel electrode 306a and the oxygen electrode 306c in the cell portion 306 are connected to a circuit board 311. Electricity generated by an electric potential difference between the fuel electrode 306a and the oxygen electrode 306c is brought out from the electric contact point 303 attached to the circuit board 311.

Furthermore, the memory 305, which stores information on the output characteristics (power generation voltage, electric current, internal resistance or the like) of the power generation unit 300, is mounted on the circuit board 311. The information on the output characteristics, which is stored in the memory 305, is transmitted to external apparatuses, such as the vertical position grip 400, the camera body 200 or the like, through the signal contact point 304. Note that portions of each electrode which come into contact with water are insulated so as not to make each electrode of the power generation unit 300 conductive through electrolyzing water during recharging. As a method for insulation, there is a method in which a portion which does not come into contact with a polymer electrolyte membrane of the electrode is covered with an insulator.

The external part of the fuel unit 301 will be described next. One side face of the fuel unit 301 includes a fitting hole 309b used to detachably connect the power generation unit 300 to the fuel unit 301 and a pipe insertion portion 307b into which the pipe 307a on the power generation unit 300 side can be inserted.

The inside of the fuel unit 301 will be described next. The inside of the fuel unit 301 is adapted to be filled with hydrogen desorbed from a hydrogen storage alloy. In order to supply hydrogen to the power generation unit 300, the pipe insertion portion 307b is provided as a hydrogen supply path. Further, the pipe insertion portion 307b includes a connecting valve mechanism 308 for preventing a leak of hydrogen when the fuel unit 301 is connected to the power generation unit 300. The connecting valve mechanism 308 is configured by a well-known connecting valve mechanism disclosed in Japanese Patent Application Laid-Open No. 10-64567.

The manner in which the fuel cell power generation unit 300 and the fuel tank or unit 301 operate to generate electric power will be described next. Hydrogen stored in the fuel unit 301 is supplied to the fuel electrode 306a through the hydrogen supply path, which includes the pipe insertion portion 307b on the fuel unit 301 side, the connecting valve mechanism 308 on the fuel unit 301 side, the connecting valve mechanism 310 on the power generation unit 300 side, and the pipe 307a on the power generation unit 300 side. Further, outside air is supplied from the vent hole 302 to the oxygen electrode 306c. Hydrogen supplied to the fuel electrode 306a reacts with oxygen in the oxygen electrode 306c through the polymer electrolyte membrane 306b. At this time, an electric potential difference between the fuel electrode 306a and the oxygen electrode 306c occurs to generate electric power. Electricity generated by the power generation unit cell portion 306 is supplied from the electric contact point 303 to an electronic apparatus which is to be driven. Note that water generated during electric power generation is discharged from the vent hole 302 as water vapor. Further, information on the output characteristics of the power generation unit 300 is transmitted to external apparatuses, such as the vertical position grip 400, the camera body 200 or the like, through the signal contact point 304.

For example, if the size of a fuel cell unit cell is approximately 1.2 cm×2 cm, the cell portion 306 can provide an electromotive force of about 0.8 V and a current density of about 300 mA/cm$^2$. If eight fuel cells are connected in series, the output of the whole battery becomes about 4.6 W at about 6.4 V and 720 mA. High voltage can be attained by increasing the number of stacked cells and connecting the cells in series. Further, an electric current during electric power generation can be increased by increasing the area of the cell.

Also, the capacity of fuel in the fuel unit 301 is proportional to the weight of the stored hydrogen storage alloy. Therefore, the capacity of fuel can be increased by increasing the amount of a hydrogen storage alloy.

FIGS. 4A to 4F each illustrate a diagram showing a combination (i.e., configuration or integration arrangement) of the fuel unit 301 and the power generation unit 300. Each combination of the power generation unit 300 and the fuel unit 301 will be described below with reference to FIGS. 4A to 4F. A plurality of combinations of the power generation unit 300 and the fuel unit 301 are provided and are configured to allow a change in accordance with the intended use. FIGS. 4A to 4F exemplarily illustrate a prepared plurality of combinations of the power generation unit 300 and the fuel unit 301.

Figure 4A:
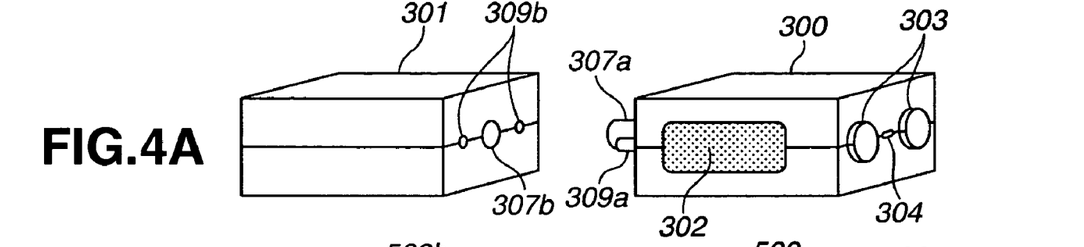
FIG. 4A illustrates a diagram showing a combination example of a fuel unit and a power generation unit according to the embodiment of the present invention.

The combination shown in FIG. 4A represents a standard combination of the power generation unit 300 and the fuel unit 301. The area of the fuel cell is divided into a 1:1 ratio of the power generation unit 300 to the fuel unit 301.

Figure 4B:
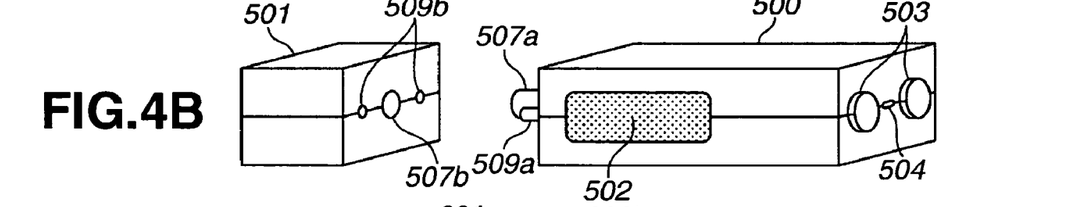
FIG. 4B illustrates a diagram showing another combination example of a fuel unit and a power generation unit according to the embodiment of the present invention.

The combination shown in FIG. 4B represents a fuel cell configuration in which a power generation voltage takes priority over the capacity of fuel. A power generation unit 500, which has a volume larger than that of the standard power generation unit 300, has the increased number of power generation cell portions (not shown) contained therein, thereby increasing a power generation voltage. Further, in the combination shown in FIG. 4B, since the area of the cell portion (not shown) can increase in an amount of the increased volume of the power generation unit 500, the increase of an electric current during electric power generation can also take priority. That is, the power generation unit 500 in FIG. 4B can be configured as a unit in which a voltage takes priority or a unit in which an electric current takes priority. Note that the volume of a fuel unit 501 decreases in an amount of the increased volume of the power generation unit 500, thereby making the total volume of the fuel cell constant. Further, in FIG. 4B, reference numeral 502 denotes a vent hole, reference numeral 503 denotes a power generation unit electric contact point, reference numeral 504 denotes a power generation unit signal contact point, reference numeral 507*a* denotes a pipe, reference numeral 507*b* denotes a pipe insertion portion, reference numeral 509*a* denotes a power generation unit connecting mechanism, and reference numeral 509*b* denotes a fuel unit connecting mechanism.

Figure 4C:
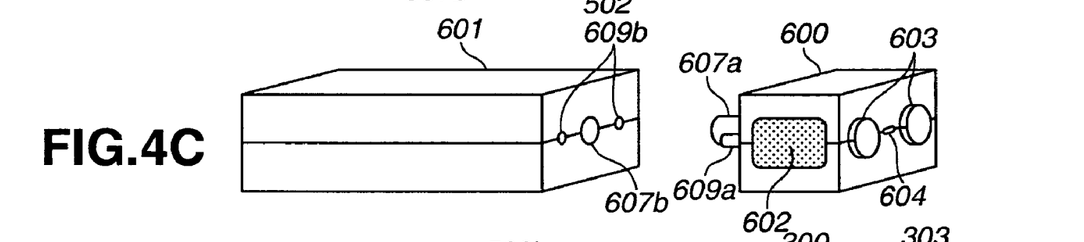
FIG. 4C illustrates a diagram showing yet another combination example of a fuel unit and a power generation unit according to the embodiment of the present invention.

The combination shown in FIG. 4C represents a fuel cell configuration in which the capacity of fuel takes priority over a power generation voltage. A fuel unit 601, the volume of which is made larger than that of the standard fuel unit 301, increases the amount of a hydrogen storage alloy (not shown) for storing hydrogen serving as fuel, thereby increasing the capacity of fuel. Note that since the capacity of a power generation unit 600 reduces in an amount of the increased volume of the fuel unit 601, the total volume as a fuel cell is made constant. Further, in FIG. 4C, reference numeral 602 denotes a vent hole, reference numeral 603 denotes a power generation unit electric contact point, reference numeral 604 denotes a power generation unit signal contact point, reference numeral 607*a* denotes a pipe, reference numeral 607*b* denotes a pipe insertion portion, reference numeral 609*a* denotes a power generation unit connecting mechanism, and reference numeral 609*b* denotes a fuel unit connecting mechanism.

Figure 4D:
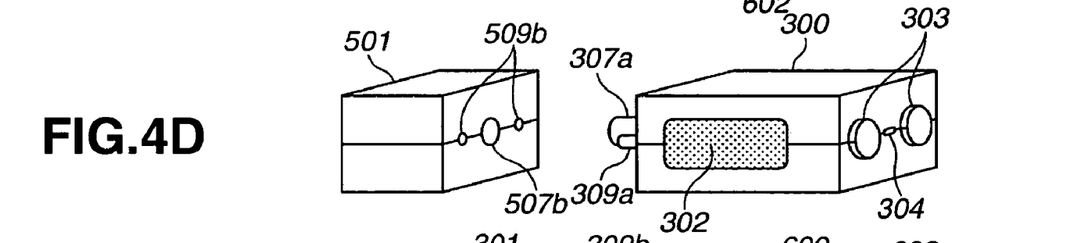
FIG. 4D illustrates a diagram showing still yet another combination example of a fuel unit and a power generation unit according to the embodiment of the present invention.

Note that since the fuel cell only needs to be contained within a predetermined area or smaller, the following configuration can also be employed. The combination shown in FIG. 4D represents a configuration having a combination of the power generation unit 300 shown in FIG. 4A and the fuel unit 501 shown in FIG. 4B. When photographing having a normal power generation voltage is carried out and the large capacity of fuel is not required, if the configuration shown in FIG. 4D is incorporated, light weight can be achieved only in an amount of the decreased volume of the fuel unit 501.

Figure 4E:
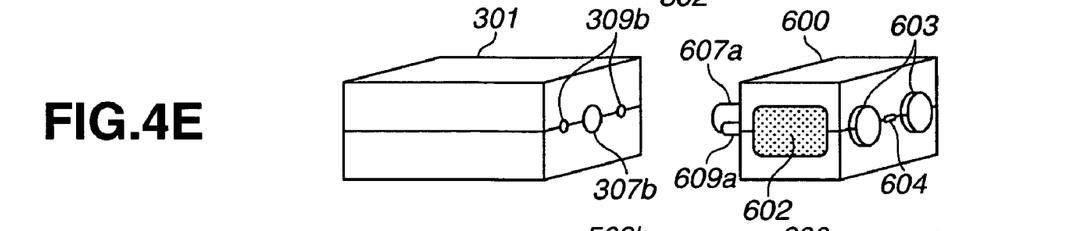
FIG. 4E illustrates a diagram showing still yet another combination example of a fuel unit and a power generation unit according to the embodiment of the present invention.

Further, the combination shown in FIG. 4E represents a configuration having a combination of the power generation unit 600 shown in FIG. 4C and the fuel unit 301 shown in FIG. 4A. When the normal capacity of the fuel is required and only a power generation voltage lower than in a normal condition is needed, if the configuration shown in FIG. 4E is incorporated, light weight can be achieved only in an amount of the decreased volume of the power generation unit 600.

Figure 4F:
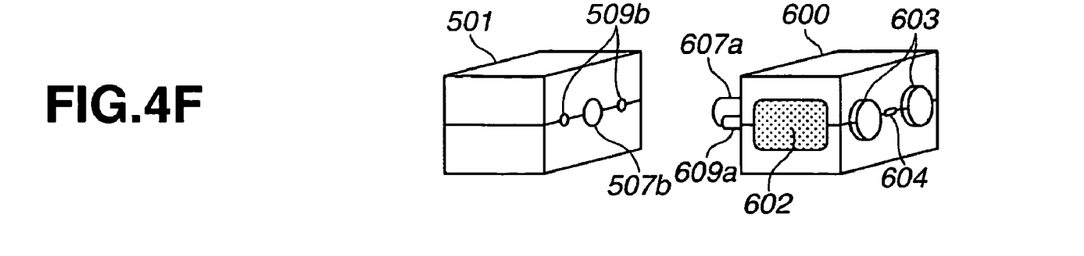
FIG. 4F illustrates a diagram showing still yet another combination example of a fuel unit and a power generation unit according to the embodiment of the present invention.

Moreover, the combination shown in FIG. 4F represents a configuration having a combination of the power generation unit 600 shown in FIG. 4C and the fuel unit 501 shown in FIG. 4B. When only a power generation voltage lower than in a normal condition is needed, the large capacity of fuel is not required, and light weight takes priority, if the configuration shown in FIG. 4F is incorporated, light weight can be achieved only in an amount of the decreased volume of the power generation unit 600 and the fuel unit 501. As described above, users can make various changes of combinations of power supply sources within the same area.

Figure 5:
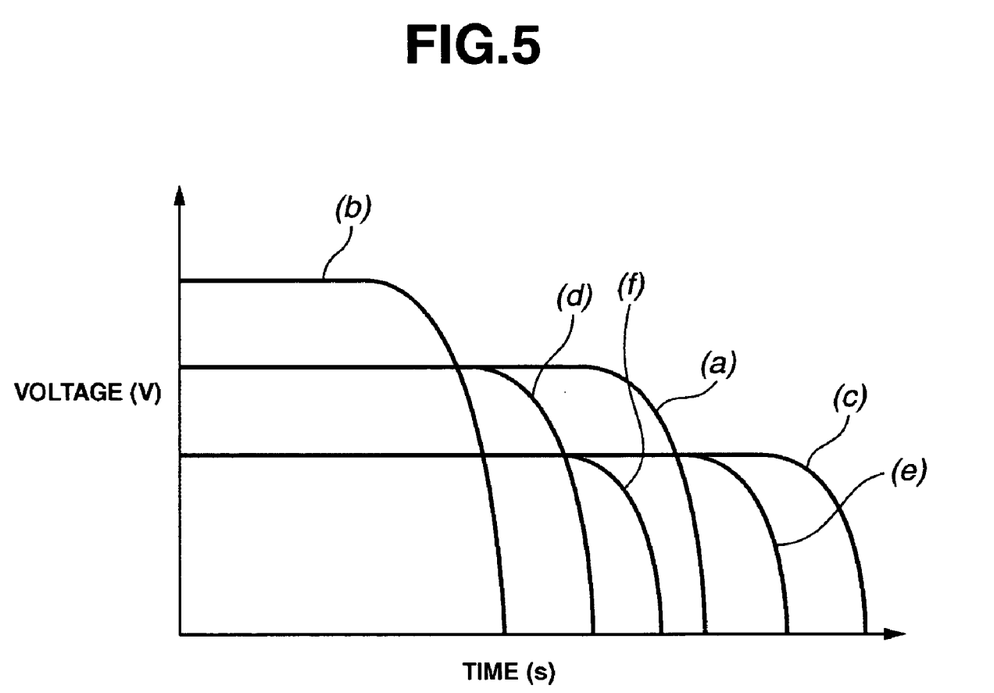
FIG. 5 illustrates an output characteristic diagram of each combination from FIGS. 4A-F of a fuel cell according to the embodiment of the present invention.

FIG. 5 illustrates a diagram schematically showing exemplary output characteristics of the fuel cell of each combination. The output characteristics of a combination of the fuel cell will be described with reference to FIG. 5. Line (a) in FIG. 5 illustrates an output characteristic diagram corresponding to FIG. 4A in a standard combination.

Line (b) in FIG. 5 illustrates an output characteristic diagram corresponding to FIG. 4B in a combination in which the volume of the power generation unit 500 is made larger than that of the standard combination and a power generation voltage takes priority. In this combination, since a power generation voltage is made larger than that of the standard combination, a camera can support a photographic sequence which requires a voltage higher than that during normal photographing. For example, photographing can be made in a high-speed continuous-shooting mode faster than in a normal condition. Further, photographing drive can also be performed while displaying an image on a display device. However, since the fuel unit 501 is made small only in an amount of the increased volume of the power generation unit 500, the amount of a hydrogen storage alloy is reduced, thereby decreasing the volume of fuel. Thus, available time of the fuel cell is made shorter and the number of continuous photographing shots is made smaller than that of the standard combination. Also, drive time of the camera is made shorter than that of the standard combination.

Line (c) in FIG. 5 illustrates an output characteristic diagram corresponding to FIG. 4C having a combination in which the volume of the fuel unit 601 is made larger than that of the standard combination and the capacity of fuel of the fuel cell takes priority. In this combination, since the capacity of fuel is made larger than that of the standard combination, available time of the fuel cell is made longer and the camera can drive for a longer time than that of a normal condition. Note that since the volume of the power generation unit 600 is made smaller in an amount of the increased volume of the fuel unit 601, the number of cell portions (not shown) of the power generation unit 600 is reduced, thereby decreasing a power generation voltage reduces. Thus, only photographing in a power saving mode is permitted. In this embodiment, the power saving mode serves as a sequence for reducing power consumption during driving of the camera. Specifically, in order to reduce electric power consumed by the shutter charge driving mechanism 211, shutter charge time is made longer, and in order to reduce the power consumption of the system controller 210, the clock number of the system controller 210 is made smaller.

Line (d) in FIG. 5 illustrates an output characteristic diagram corresponding to FIG. 4D having a combination of the standard power generation unit 300 and the fuel unit 501, the volume of which is made small. In this combination, since the fuel unit 501 the volume of which is made small for achieving light weight is used, the capacity of fuel is reduced. Thus, available time of the fuel cell is made shorter than that of the standard combination shown in FIG. 4A. Note that since power consumption is reduced in an amount of the reduced power generation voltage of the power generation unit 300 compared with the combination shown in FIG. 4B which uses the same fuel unit 501, available time of the fuel cell is made longer than that of the combination shown in FIG. 4B.

Line (e) in FIG. 5 illustrates an output characteristic diagram corresponding to FIG. 4E having a combination of the standard fuel unit 301 and the power generation unit 600 the volume of which is made small. In this combination, since the power generation unit 600 the volume of which is made small for achieving light weight is used, the number of cell portions (not shown) of the power generation unit 600 is reduced, thereby decreasing a power generation voltage. Thus, only photographing in a power saving mode is permitted. However, if the combination in FIG. 4E is compared with the combination in FIG. 4A which uses the same fuel unit 301, power consumption is reduced in an amount of the decreased power generation voltage of the power generation unit 300. Thus, the number of continuous photographing shots is made larger than that of the combination in FIG. 4A.

Line (f) in FIG. 5 illustrates an output characteristic diagram corresponding to FIG. 4F having a combination of the power generation unit 600 the volume of which is made small and the fuel unit 501 the volume of which is made small. In this combination, since a power generation voltage is decreased by using the power generation unit 600 the volume of which is made small, only photographing in a power saving mode is permitted. Further, since the fuel unit 501 the volume of which is made small is used, the capacity of fuel is smaller than that of the standard combination. If the combination in FIG. 4F is compared with the combination in FIG. 4E which uses the same power generation unit 600, the capacity of fuel is reduced by using the fuel unit 501 the volume of which is made small for achieving light weight. Thus, available time of the fuel cell is made shorter than that of the combination in FIG. 4E. However, if the combination in FIG. 4F is compared with the combination in FIG. 4D which uses the same fuel unit 501, power consumption is reduced in an amount of the decreased power generation voltage of the power generation unit 300. Thus, available time of the fuel cell is made longer than that of the combination in FIG. 4D.

Figure 6:
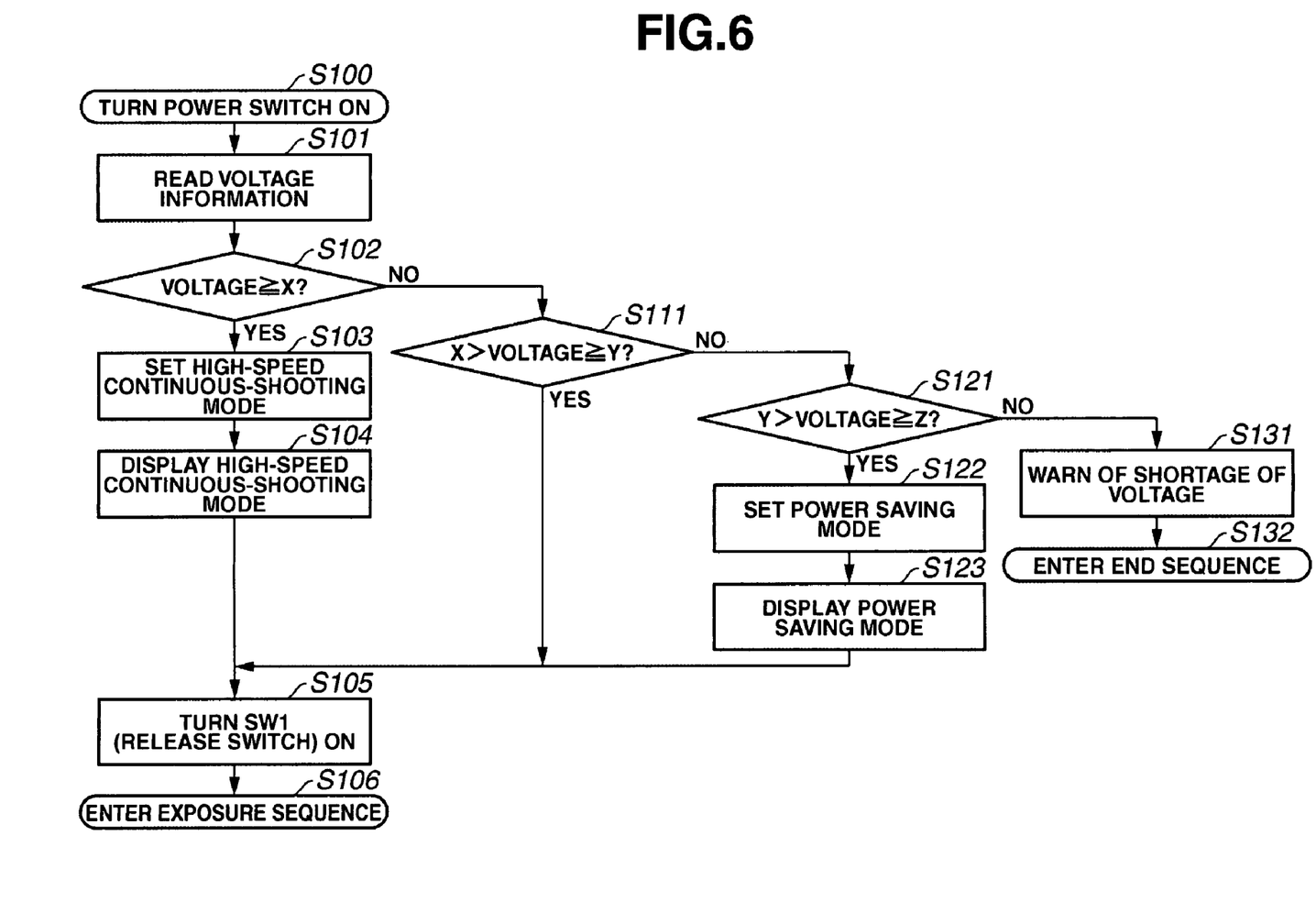
FIG. 6 illustrates an exemplary flow chart according to the embodiment of the present invention.

FIG. 6 illustrates an exemplary flow chart showing determination in power generation units according to the embodiment of the present invention. In particular, a method for determining a power generation unit according to the embodiment of the present invention will be described with reference to FIG. 6.

In step S100, if a main switch of the camera body 200 is turned on, processing proceeds to step S101. In step S101, the system controller 210 reads voltage information on the power generation unit 300. Reading of the voltage information on the power generation unit 300 is carried out in such a manner that the memory 305 of the power generation unit 300 sends an electric signal to the system controller 210 through the vertical position grip electric contact points 406 and the power generation unit signal contact point 304. If the voltage information is read in step S101, a read voltage is determined in step S102. If it is determined that the read voltage is a predetermined value X or larger, processing proceeds to step S103.

In step S103, the camera operation is set to perform a high-speed continuous-shooting mode drive. In this embodiment, the predetermined value X represents a voltage enabling the camera body 200 to sufficiently perform the high-speed continuous-shooting mode drive. In setting the camera operation, the system controller 210 sends an electric signal to the shutter charge driving mechanism 211 and the shutter control circuit 212 so as to set high-speed charging. When, in step S103, the high-speed continuous-shooting mode is set, the setting of the high-speed continuous-shooting mode is displayed in step S104. That is, the system controller 210 sends an electric signal to a display device (not shown) through the display circuit 226, thereby displaying the setting of the high-speed continuous-shooting mode to inform a user of the setting. When the setting of the high-speed continuous-shooting mode is displayed in step S104 and the release switch 202 is turned on in step S105, processing proceeds to step S106 to enter a well-known photographic sequence.

On the other hand, if in step S102 it is determined that the read voltage is less than the predetermined value X, it is determined in step S111 whether a voltage of the voltage information on the power generation unit 300 is a predetermined value Y or larger. If in step S111 it is determined that the voltage of the voltage information on the power generation unit 300 is the predetermined value Y or larger, processing proceeds to step S105. When the release switch is turned on in step S105, processing proceeds to step S106 to enter the well-known photographic sequence. In this embodiment, the predetermined value Y represents a voltage enabling the camera body 200 to sufficiently perform normal drive.

On the other hand, if in step S111 it is determined that the read voltage is less than the predetermined value Y, it is determined in step S121 whether the read voltage is a predetermined value Z or larger. If in step S121 it is determined that the read voltage is the predetermined value Z or larger, processing proceeds to step S122. In step S122, the camera operation is set to perform the power saving mode drive. In this embodiment, the predetermined value Z represents a voltage enabling the camera body 200 to sufficiently perform the power saving mode drive. In setting the camera operation, the system controller 210 sends an electric signal to the shutter charge driving mechanism 211 and the shutter control circuit 212 so as to set low-speed charging. Further, since the system controller 210 itself reduces power consumption, a reading speed of the CMOS sensor 209 is reduced, thus reducing the clock number. When, in step S122, the power saving mode is set, the setting of the power saving mode is displayed in step S123. That is, the system controller 210 sends an electric signal to a display device (not shown) through the display circuit 226, thereby displaying the setting of the power saving mode to inform a user of the setting. When the setting of the power saving mode is displayed in step S123 and the release switch 202 is turned on in step S105, processing proceeds to step S106 to enter the well-known photographing sequence.

On the other hand, if in step S121 it is determined that the voltage of the voltage information on the power generation unit 300 is less than the predetermined value Z, a shortage of the voltage of the power generation unit 300 is displayed in step S131 to give warning to a user. That is, the system controller 210 sends an electric signal to an ILC or OLC (not shown) through the display circuit 226, thereby displaying the shortage of the voltage of the power generation unit 300 to inform a user of that shortage. When, in step S131, the shortage of the voltage of the power generation unit 300 is displayed, processing proceeds to step S132 to enter a well-known end sequence.

In the above-described embodiment of the present invention, a fuel unit has been exemplarily described as using a hydrogen storage alloy. However, a fuel unit using a liquid such as ethanol or the like can also be employed.

Further, in the above-described embodiment of the present invention, a power generation unit has been exemplarily described as having an electric contact point on a vertical plane relative to the insertion direction of the fuel cell. However, the electric contact point can be placed on a parallel plane relative to the insertion direction of the fuel cell.

Furthermore, in the above-described embodiment of the present invention, a memory has been exemplarily described as holding output characteristic information of the power generation unit. However, a bar code, a magnetic tape, an IC chip or the like can hold the output characteristic information, and the output characteristic information can be read by the camera body side.

Still furthermore, in the above-described embodiment of the present invention, a power generation unit has been exemplarily described as transmitting output characteristic information by an electric signal. However, the output characteristic information of the power generation unit can be transmitted by a mechanical structure, such as a detection switch, a notch or the like.

Further, in the above-described embodiment of the present invention, a vertical position grip has been exemplarily described as having an open/close door. However, a door portion can be integrated with a fuel unit.

Further, in the above-described embodiment of the present invention, a joint part has been exemplarily described as connecting the power generation unit and the fuel unit by light fitting. However, the power generation unit and the fuel unit can be connected by a screw, a latch claw or the like.

Further, in the above-described embodiment of the present invention, a change of the operation of an electronic apparatus is made based on voltage information of the power generation unit. However, a change of the operation can be made based on information on an electric current or internal resistance.

Further, in the above-described embodiment of the present invention, a camera has been exemplarily described as an electronic apparatus. However, the present invention is not limited to this but can be applied to other electronic apparatuses such as, for example, a laptop PC, a portable telephone, a PDA or the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-040676 filed Feb. 17, 2005, which is hereby incorporated by reference herein in its entirety.

What is claimed is:

1. An electronic apparatus configured to be driven by a fuel cell, the fuel cell including a fuel unit and a power generation unit, the fuel unit being configured to store fuel, the power generation unit being configured to generate electric power with at least one power generation cell by receiving fuel from the fuel unit, the electronic apparatus comprising:
    a fuel cell storage section configured to store both the fuel unit and the power generation unit,
        wherein the fuel cell storage section is adapted to store a fuel unit selected from a group of same type of fuel units, but wherein each fuel unit from the group has at least one of a different fuel capacity or physical packaging size,
        wherein the fuel cell storage section is further adapted to store a power generation unit selected from a group of same type of power generation units, but wherein each power generation unit from the group has at least one of a different power output characteristic or physical packaging size, and
        wherein the selected fuel unit and power generation unit are further adapted to be integrated together and combined to form the fuel cell; and
    a power generation unit determination device configured to determine an output characteristic of the power generation unit,
        wherein the power generation unit determination device determines output characteristics of the fuel generation unit making up the fuel cell stored in the storage section.

2. The electronic apparatus according to claim 1, further comprising an operation change unit configured to change an operation of the electronic apparatus in accordance with determination by the power generation unit determination device.

3. The electronic apparatus according to claim 1, wherein the output characteristic to be determined by the power generation unit determination device includes at least one of a voltage, an electric current, and an internal resistance of the power generation unit.

4. A camera configured to be driven by a fuel cell, the fuel cell including a fuel unit and a power generation unit! the fuel unit being configured to store fuel, the power generation unit being configured to generate electric power with at least one power generation cell by receiving fuel from the fuel unit, the camera comprising:
    a fuel cell storage section configured to store both the fuel unit and the power generation unit,
        wherein the fuel cell storage section is adapted to store a fuel unit selected from a group of same type of fuel units, but wherein each fuel unit from the group has at least one of a different fuel capacity or physical packaging size,
        wherein the fuel cell storage section is further adapted to store a power generation unit selected from a group of same type of power generation units, but wherein each power generation unit from the group has at least one of a different power output characteristic or physical packaging size, and
        wherein the selected fuel unit and power generation unit are further adapted to be integrated together and combined to form the fuel cell; and
    a power generation unit determination device configured to determine an output characteristic of the power generation unit,
        wherein the power generation unit determination device determines output characteristics of the fuel generation unit making up the fuel cell stored in the storage section.

5. The camera according to claim 4, further comprising, an operation change unit configured to change an operation of the camera in accordance with determination by the power generation unit determination device.

6. The camera according to claim 4, wherein the output characteristic to be determined by the power generation unit determination device includes at least one of a voltage, an electric current, and an internal resistance of the power generation unit.

7. The camera according to claim 5, wherein the operation change unit sets a continuous-shooting speed to a speed higher then a normal continuous-shooting speed when a voltage of the power generation unit determined by the power generation unit determination device is a predetermined value or larger.

8. The camera according to claim 5, wherein the operation change unit sets the camera to a power saving mode when a voltage of the power generation unit determined by the power generation unit determination device is smaller than a predetermined value.

9. The camera according to claim 4, wherein the fuel cell storage section is provided inside a vertical position grip located below an optical axis of the camera.

* * * * *